United States Patent [19]

Sandrock

[11] Patent Number: 5,345,831
[45] Date of Patent: Sep. 13, 1994

[54] DRIVE FOR LINEAR PICK-AND-PLACE ASSEMBLY APPARATUS

[75] Inventor: Don G. Sandrock, McHenry, Ill.

[73] Assignee: Emerson Electric Co., St. Louis, Mo.

[21] Appl. No.: 80,315

[22] Filed: Jun. 22, 1993

[51] Int. Cl.⁵ .............................................. F16H 21/16
[52] U.S. Cl. ...................... 74/53; 198/468.6; 414/733
[58] Field of Search .............. 74/53; 198/468.6, 774.3; 414/733

[56] References Cited

U.S. PATENT DOCUMENTS

| | | | |
|---|---|---|---|
| Re. 29,797 | 10/1978 | Mink | 214/1 |
| 2,073,097 | 3/1937 | Dziedzic et al. | 198/468.6 X |
| 3,881,362 | 5/1975 | Beezer | 74/53 |
| 4,363,395 | 12/1982 | Mink | 198/486 |
| 4,453,882 | 6/1984 | Mang | 74/53 X |
| 4,462,741 | 7/1984 | Sogawa et al. | 74/53 X |
| 4,599,909 | 7/1986 | Koller | 74/53 X |
| 4,667,531 | 5/1987 | Kato et al. | 74/567 |
| 4,678,393 | 7/1987 | Mink | 414/751 |
| 4,896,560 | 1/1990 | Kato | 74/569 |

*Primary Examiner*—Allan D. Herrmann
*Attorney, Agent, or Firm*—Tilton, Fallon, Lungmus & Chestnut

[57] ABSTRACT

An improved drive apparatus for use with linear pick-and-place assembly devices is disclosed, which drive apparatus includes a movable carriage having an improved guide track assembly. The guide track assembly comprises a series of V-rollers and mating V-tracks to provide the vertical and horizontal translational movements for a linear pick-and-place assembly device's output member. The guide track assembly includes V-roller elements which can be eccentrically adjusted to create a tight, pre-loaded sliding engagement with the mating V-tracks, all so as to substantially eliminate any undesired end play movement within the movable carriage.

13 Claims, 4 Drawing Sheets

Fig. 2
Fig. 2A
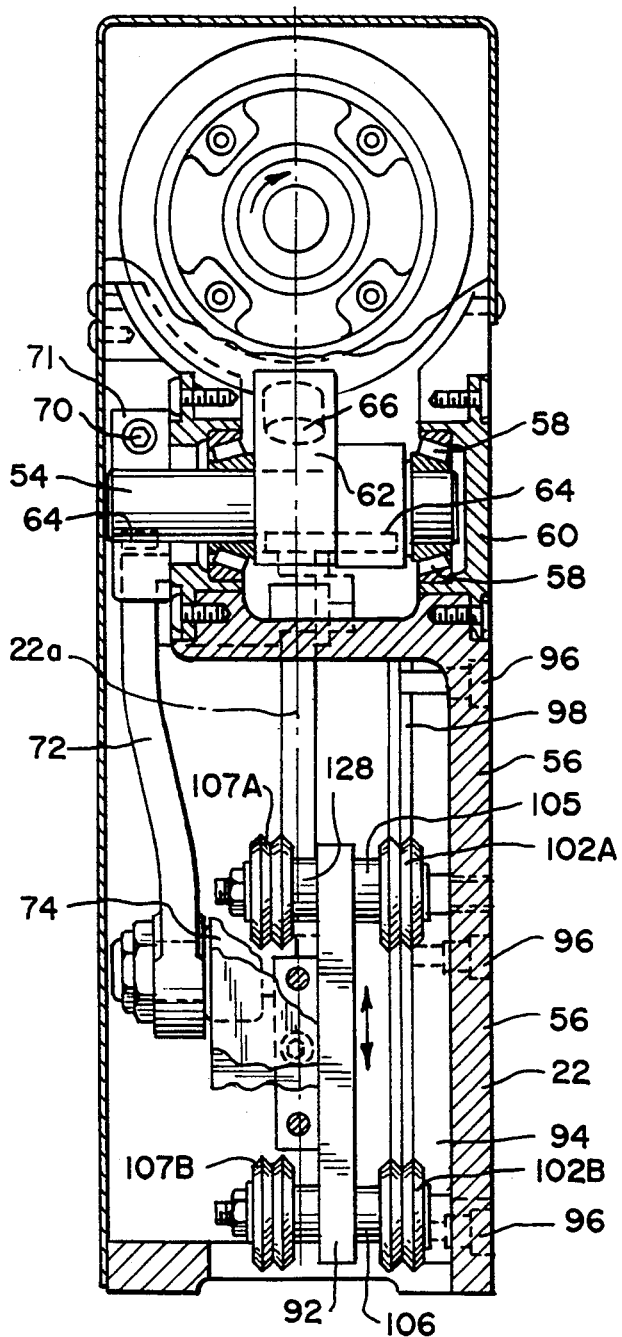
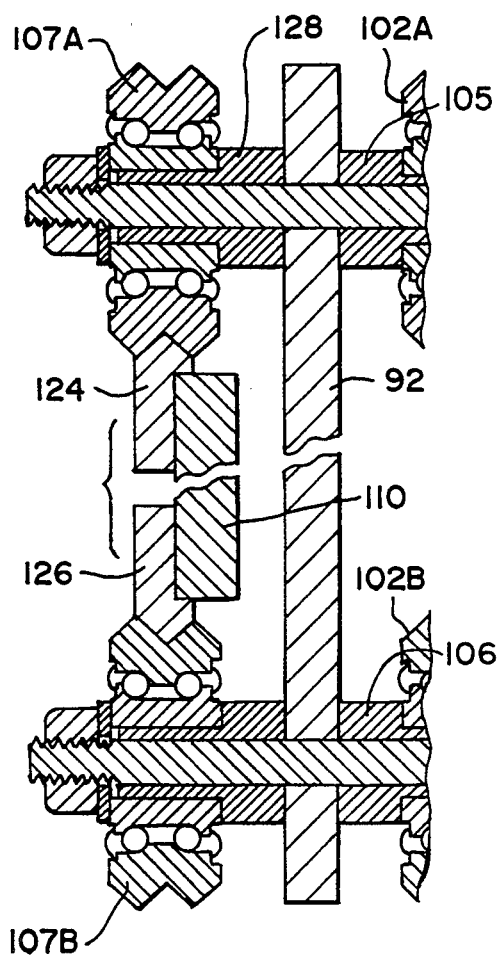

DRIVE FOR LINEAR PICK-AND-PLACE ASSEMBLY APPARATUS

FIELD OF THE INVENTION

This invention relates to linear pick-and-place assembly devices, and more specifically, to a cam-actuated drive apparatus for a linear pick-and-place device.

BACKGROUND OF THE INVENTION

Cam-driven, automated assembly apparatus are becoming more prevalent in industrial assembly applications. One type of automated assembly device is the so-called linear pick-and-place device. Its output is pre-designed, via specific cam design selection, to provide both vertical and horizontal movements to its output, and any associated end effector member, e.g., a pick-up device or robot hand. The resultant output is both in and out, as well as up and down, thereby allowing various types of motion sequences for assembly applications, dependant upon what cam design is used. For example, with such a linear pick-and-place device, a part can be picked up at one location, moved vertically, horizontally transferred over to another location, and then dropped vertically in place, such as in an associated tooling station or die set, whereafter the sequence is repeated for the next part.

The known linear pick-and-place devices of the prior art typically use a movable carriage device, driven by associated cam members, which carriage typically has two hardened and grounded output shafts which slide upon and within multiple bearing assemblies carried by the carriage. Such ground multiple output shaft arrangements are known in the industry as Thompson (Trademark) shafts. See, for example, U.S. Pat. No. 3,881,362, which typifies this type of linear pick-and-place device.

The movable carriage units for such known linear pick-and-place devices are cumbersome and costly. Also, all the known designs of prior art linear pick-and-place devices suffer the disadvantage of having their output member aligned off-center from the unit's input shaft. This is due to interference of the multiple shaft carriage unit with the cam members if the former is placed in centered alignment with the latter. Inherently, such designs are relatively wide. Therefore, in many applications, such as where multiple linear pick-and-place devices need to be aligned in side-by-side parallel fashion for a given assembly application, they are often unusable.

The present invention overcomes these difficulties by utilizing, in the drive of a linear pick-and-place apparatus, a unique guide track assembly for the movable carriage. A series of V-rollers and mating V-tracks are used for both the vertical and horizontal (i.e., translation) movements of the apparatus' output member. Further, the V-track assembly utilizes V-roller elements which can be eccentrically adjusted to affect a tight, i.e., pre-loaded, sliding engagement with the mating V-tracks. Thereby, substantially all undesired end play movement within the movable carriage is eliminated, in both the vertical and horizontal directions.

Thus, it is an object of the present invention to provide an improved drive for a linear pick-and-place device which utilizes a V-track and V-roller assembly to result in a stiffer design resulting in greater accuracy in picking and placing of parts and which permits center-line alignment of the device's input and output members.

It is another object of the present invention to utilize a V-roller and V-track carriage assembly for a linear pick-and-place device which substantially eliminates all end play during vertical and horizontal translation movements of the device's output member.

The above and other objects of the invention of the present invention are accomplished and the manner of their accomplishment will be readily understood from the following specification upon reference to the accompanying drawings, in which:

FIG. 2 is a rear end elevation view of the drive apparatus of FIG. 1;

FIG. 2A is a rear section view of a portion of the V-track carriage assembly of the drive apparatus of the present invention;

DESCRIPTION OF THE PREFERRED EMBODIMENT

Figure 1:
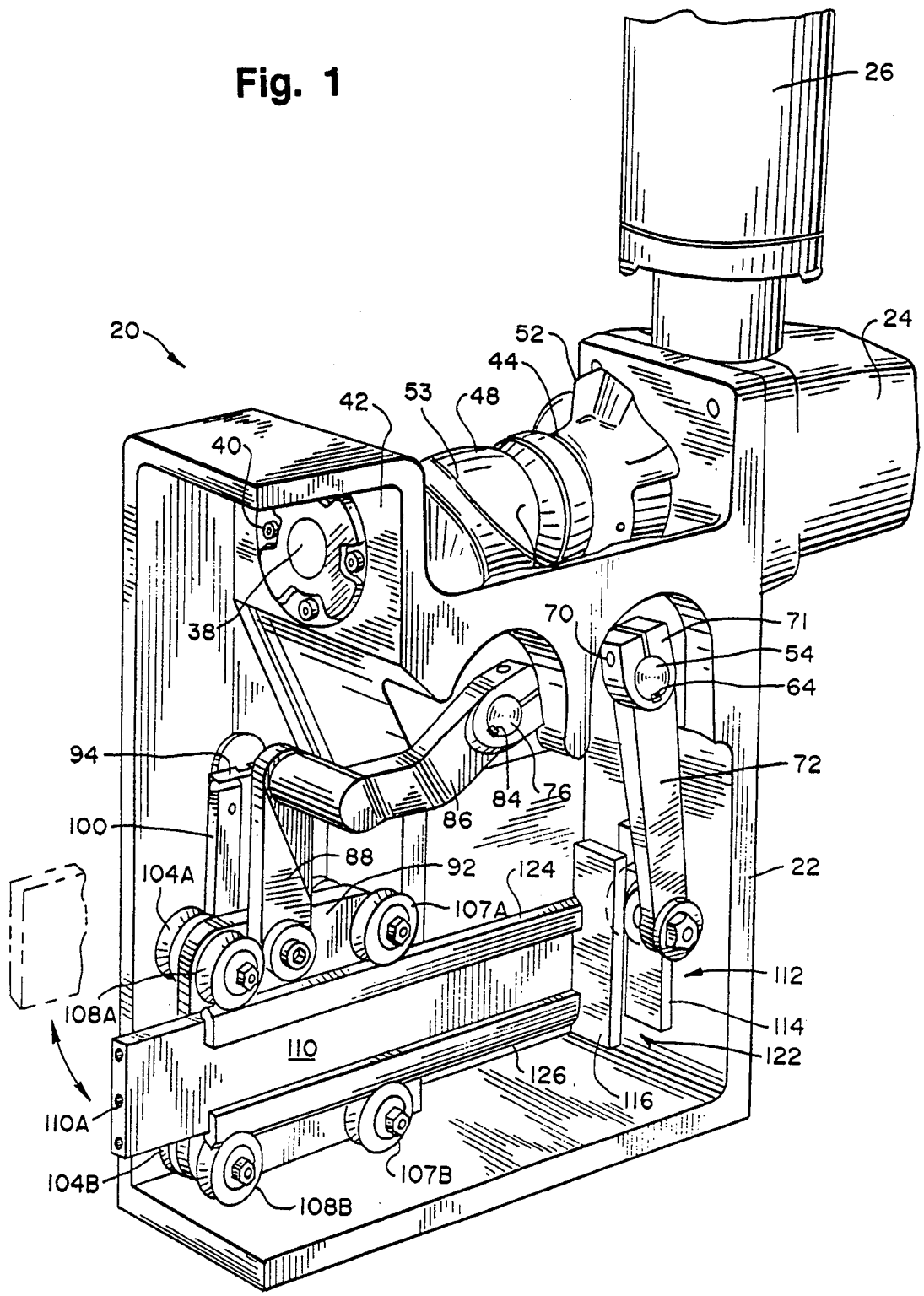
FIG. 1 is a front perspective view of the improved linear pick-and-place drive apparatus of the present invention, with portions broken away for better viewing.

Having reference to the drawings, wherein like reference numerals indicate corresponding elements, there is shown in FIG. 1 the improved linear pick-and-place drive apparatus of the present invention, generally denoted by reference numeral 20. Apparatus 20 includes a housing 22 to which can be mounted, for example, a reducer 24 and a motor 26 for providing the required rotational drive to an input shaft 28 (see FIG. 3). Alternatively, it will be understood that any other type of rotary drive can be used to give input shaft 28, such as a belt-drive, a line-shaft drive, or a gear drive such as a bevel gear drive. Any one of these alternative drive arrangements might desirably be used, for example, where one common drive is to be used to drive the respective input shafts of multiple linear pick-and-place apparatus 20, whether aligned in a circular or in a linear arrangement (see FIGS. 6–9). The only drive requirement for the present invention is that some type rotary input motion be provided to the input shaft 28.

The input shaft 28 is journalled for rotation on housing 22 at one end (right end in FIG. 3) by roller bearings 30 carried in an open bearing cartridge 32 fastened by fasteners 34 to housing 22, and at the other end (left end in FIG. 3) by roller bearings 36 carried in a closed bearing cartridge 38, which cartridge is fastened by fasteners 40 to housing support wall 42.

Figure 3:
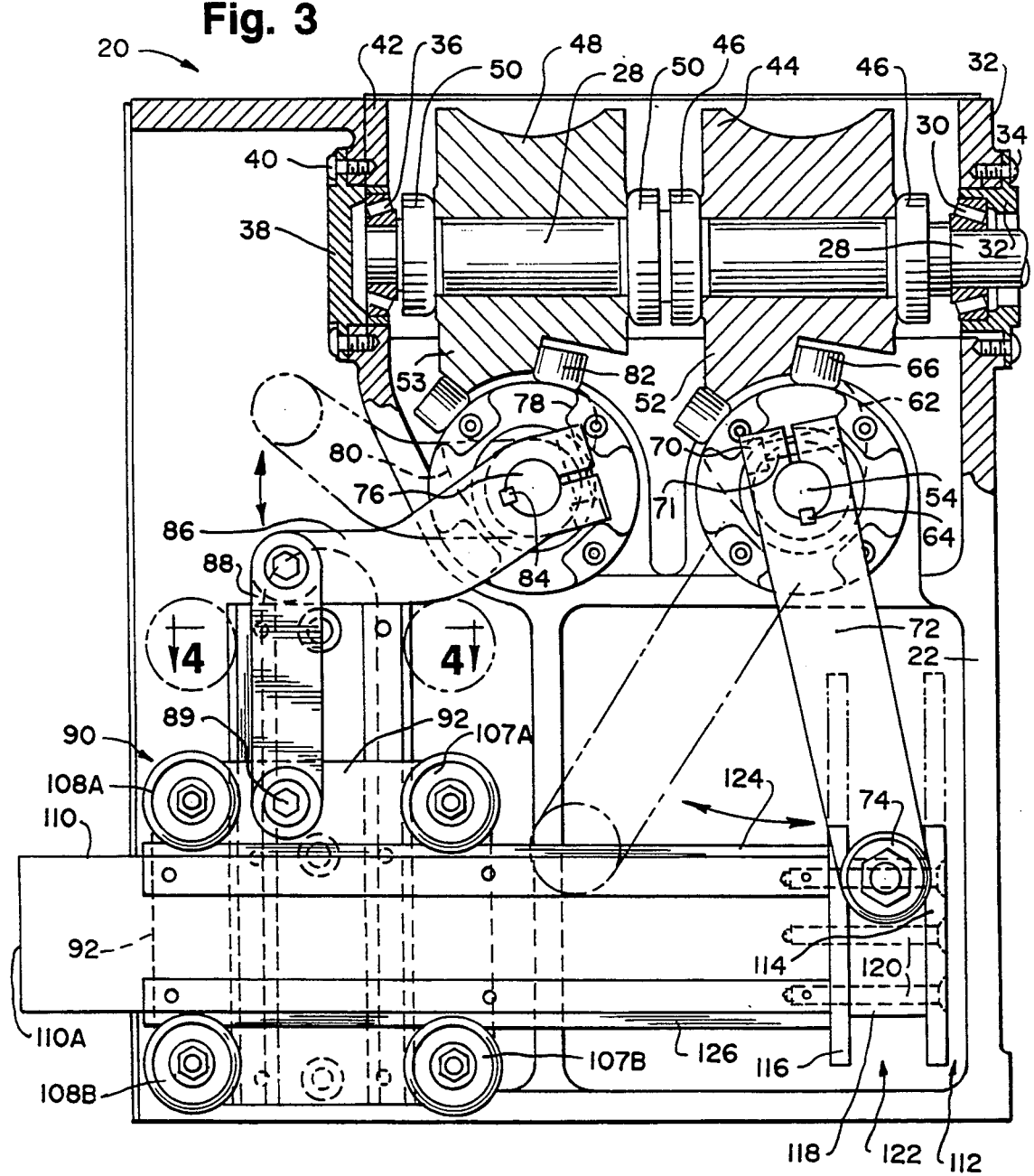
FIG. 3 is a side elevation view (viewed from the right side) of the drive apparatus of FIG. 1, with portions broken away for better viewing.

The input shaft 28 carries a first or translator cam 44 positioned therealong by cam retainer mounts 46, and also a second or lift cam 48 positioned therealong by cam retainer mounts 50. The respective translator and lift cams 44, 48 are depicted in FIG. 3 as being so-called roller gear or globoidal type cams. Alternatively, other type cams, such as parallel cams or box cams, could be used. However, the roller gear-type cam has the advantage of permitting the thinnest overall width of the apparatus 20. This is especially important when multiple apparatus 20 are to be used in a parallel, side-by-side, gang fashion, such as in an assembly application having small, i.e., tight spacing. In any event, the respective cams 44, 48 are rotatably driven by the input shaft 28, and include respective cam drive ribs 52, 53.

As seen in FIGS. 2 and 3, a first follower output shaft 54 is carried on housing side wall 56 by tapered roller bearings 58 and a closed bearing cartridge 60. A follower wheel segment 62 is rigidly secured, via key 64 (see FIG. 2), to the first output shaft 54. The follower wheel segment 62 carries two roller cam followers 66 which are so mounted on segment 62 as to engage the rib 52 of translator (i.e., horizontal motion) cam 44. Thus, rotation of input shaft 28 causes the translator cam 44, via cam rib 52, to drivably oscillate (via cam followers 66 and follower wheel segment 62) the first output shaft 54.

Also mounted to output shaft 54, via a key 64 (see FIG. 2) and a fastener 70 extending through a split yoke clamp end 71, is a translator arm 72. The outer free end (lower end in FIG. 3) of translator arm 72 carries a roller follower 74. Oscillation of output shaft 54 via translator cam 44 causes the translator arm 72 to oscillate its roller follower 74 between the solid and phantom line positions shown in FIG. 3.

Similar to first output shaft 54, a second output shaft 76 is rotatably journalled on housing side wall 56 via roller bearings and a closed bearing cartridge 78. A second follower wheel segment 80, keyed to second output shaft 76, carries a pair of roller cam followers 82 which engage the cam rib 53 of the lift cam 48. In similar fashion as with rotating translator cam 44, rotation of lift cam 48 causes its drive rib 53 to drivably oscillate the second output shaft 76 via follower segment 80 and cam followers 82. The respective cam followers 66, 82, are forcibly engaged, i.e., pre-loaded during assembly, into the drive ribs 52, 53 of the respective cams 44, 48. This operates to substantially eliminate any undesired lost motion, i.e., end play movement, during operation of the cams 44, 48.

A second or lift arm 86 is rigidly retained by key 84 to the second output shaft 76. The driven oscillation of second output shaft 76 causes the lift arm 86 to oscillate between its solid and phantom line positions shown in FIG. 3. A lift link 88 is fastened at its upper end to lift arm 86 and at its lower end through a connector pin 89 (with pin and needle bearings) to the present invention's unique V-track carriage assembly, generally denoted by reference numeral 90.

Figure 4:
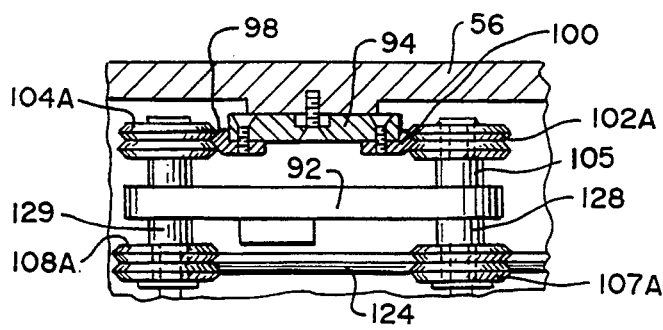
FIG. 4 is a top section view of a portion of the V-track carriage assembly of the drive apparatus of the present invention, viewed along lines 4—4 of FIG. 3.

The carriage assembly 90 includes a carriage plate 92 which undergoes vertical movement under the operation of vertically-oscillating lift arm 86 and lift link 88. A carriage guide bar 94 is fixably mounted to the housing side wall 56 by fasteners 96. Bar 94 has mounted to it a pair of parallel aligned and opposed hardened V-way tracks 98, 100 (see FIG. 4).

The carriage plate 92 carries on one side thereof a rear pair of V-rollers 102A, 102B and a front pair of V-rollers 104A, 104B, all journably mounted to plate 92. Each pair of V-rollers is operable to slidably receive a respective V-way track. That is, the respective rear rollers (102A, 102B) and front rollers (104A, 104B) respectively vertically slide along rear and front stationary vertical V-way tracks 98, 100, the latter being mounted on stationary carriage guide bar 94. Importantly, one pair of V-rollers 102A, 102B, is affixed to carriage plate 92, whereas the other pair of V-rollers 104A, 104B is eccentrically mounted thereto. That is, rotation of the eccentric bushing members 105, 106, carried respectively on the eccentric V-rollers 104A, 104B, allows those eccentric rollers to be rotated into a tight sliding engagement with, i.e., pre-loaded into, their respective V-way tracks 98. This adjustable pre-loading of the vertical sliding components of carriage assembly 90 acts to substantially eliminate any end-play motion thereof.

Similarly, a pair of rear V-roller sets 107A, 107B and front V-roller sets 108A, 108B (see FIGS. 1 and 2A) are journably mounted on the other side of carriage plate 92 from V-roller sets 102, 104. A translator bar 110 is used as the output member for the linear pick-and-place apparatus 20. Translator bar 110 has a scotch yoke member, generally denoted by reference numeral 112, carried at its right end (see FIG. 3). Scotch yoke 112 comprises a hardened outer plate 114 and a hardened inner plate 116 spaced apart by a spacer plate 118, all the plates being fastened to the translator bar via fasteners 120. The respective spaced-apart plates 114, 116 form a translator track 122 within which the roller follower 74 of oscillating translator arm 72 can vertically slide.

Translator bar 110 also carries respective upper and lower hardened V-way tracks 124, 126. The respective upper rear V-rollers 107A and upper front V-rollers 108A, and lower rear V-rollers 107B and lower front V-rollers 108B slidably receive the respective V-way tracks 124, 126 carried on bar 110. Similar to the V-way tracks carried by carriage guide bar 94, the upper rear V-roller 107A and upper front V-roller 108A are eccentrically mounted (via eccentric bushings 128, 130) so that the upper V-rollers 107A, 108A are able to be forcibly engaged, i.e., pre-loaded, into the V-track 124. This operates to eliminate any end play for the horizontally sliding, i.e., translating, movements of bar 110 (when moving between its solid and phantom line end positions shown in FIG. 3). Movement of translator arm 72 results in horizontal stroking, i.e., translating movement, of translator bar 110.

Thus, through the use of adjustably pre-loaded V-rollers and V-tracks, coupled with the presence of a distance spread between associated sets of V-rollers as mounted on the carriage plate 92, the carriage plate 92 is able to move vertically along carriage guide bar 94, while the translator bar 110 is simultaneously able to move horizontally (i.e., translate) of carriage plate 92.

Figure 5:
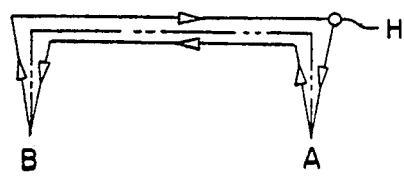
FIG. 5 is a schematic of a typical motion sequence produced by the drive apparatus of FIG. 1.

FIG. 5 illustrates the motion sequence of the outer end 110a of translator bar 110. Typically, end 110a starts at a home position H and then upon rotation of input shaft 28, the lift cam 48 causes the carriage plate and translator bar to cycle downward to a work station A. Then the lift cam causes upward movement while the translator cam 44 cause the translator bar 110 to move upward until it is at a predetermined height. Once this predetermined height is reached, the lift cam 48 stops to cause vertical motion of the translator bar 110, and the translator cam 44 causes the translator bar 110 to extend horizontally outward a predetermined distance. At the end of that cycle, the lift cam 48 once again causes the translator bar 110 to move downward to work station B, and then back upward a predetermined distance for the return stroke to the home position H. The vertical stroke and horizontal stroke of the end 110A of the translator bar 110 can be varied to suit any particular purpose, for example, a vertical stroke of 2" and a horizontal stroke of 4", a vertical stroke of 3" and a horizontal stroke of 8", a vertical stroke of 4" and a horizontal stroke of 12", or a vertical stroke of 5" and a horizontal stroke of 16" have been found to be useful.

Depending upon the particular application, any type of manipulator means, i.e., end effector, such as a robot hand or arm, can be positioned on the end 110a of the translator bar 110 to achieve the desired effect. Coordinating the particular implement used on end 110a and the particular vertical and horizontal cycles can be varied as known in the art to fit the requirements of a particular, desired operation of the present linear pick-and-place device.

The above-construction of the improved linear pick-and-place apparatus of this invention is particularly advantageous in that translator bar 110 is centrally aligned of the housing 22 and is also directly in line with a center line of the input shaft 28. This is advantageous over prior systems in which the output members were offset from the center of the housing and from the input shaft. Such offset positioning of the output member was necessary as prior carriage systems would interfere with the cam mechanisms, precluding on-center alignment. By aligning the axis of the translator bar and the input shaft, the entire unit of the present invention utilizes a smaller width than such prior systems, allowing multiple units to be placed in tightly spaced parallel relation, or in a circular arrangement.

Figure 6:
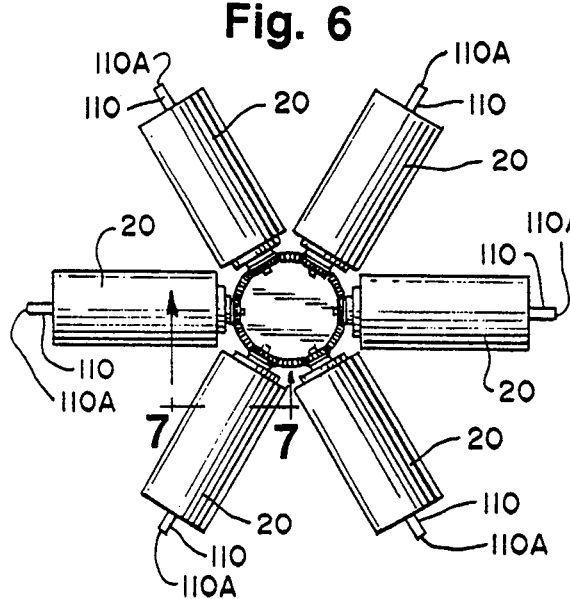
FIG. 6 is a somewhat diagrammatic top view of a plurality of the improved linear pick-and-place drive apparatus of the present invention arranged in a circular pattern.
Figure 7:
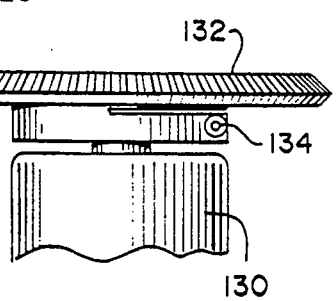
FIG. 7 is a side elevational view taken along line 7—7 of FIG. 6, illustrating engagement of a linear pick-and-place input shaft with the drive means.

FIGS. 6 and 7 illustrate a particularly advantageous use of the improved pick-and-place apparatus 20 of the present invention. Six devices 20 are radially positioned substantially equidistant about a central axis such that a central drive means, shown as motor 130, can be positioned to drive all six units. Drive unit 130 is shown connected to a bevel gear 132 by a capscrew 134, although any type of similar fastening means can be used. Bevel gear 132 is shown engaging bevel gears 136 which in turn are mounted to the input shafts 28 of each of the six units 20. The alignment of the translator bar 110 and the input shaft 28 on a common center line allows this configuration to advantageously be used for circular belt ways or other conveyor means disposed around the six radially placed units.

Figure 8:
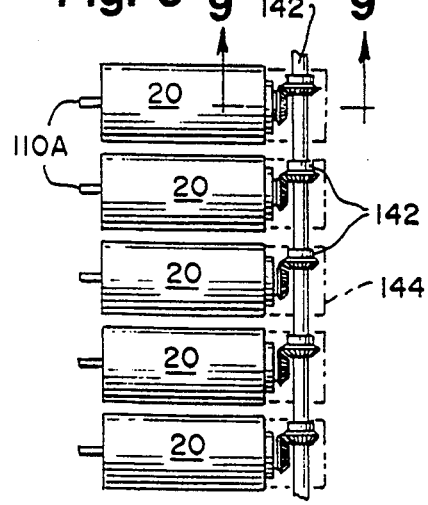
FIG. 8 is a somewhat diagrammatic top view of a plurality of the improved linear pick-and-place drive apparatus of the present invention arranged in parallel sequence.
Figure 9:
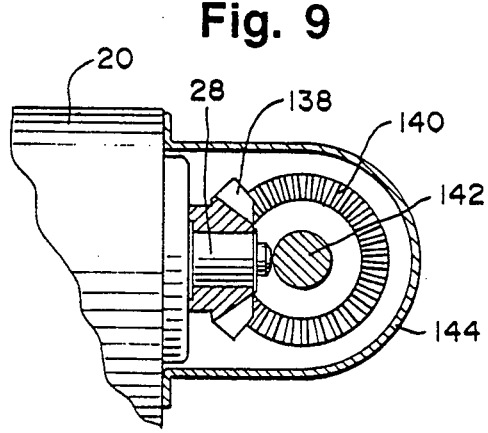
FIG. 9 is a side elevational, partial cross-sectional view taken along line 9—9 of FIG. 8, illustrating engagement of a linear pick-and-place input shaft with the drive means.

FIGS. 8 and 9 illustrate another arrangement of a plurality of units 20, here in parallel placement. The alignment of the input shaft 28 and the translator bar 110 in each of the units allows such placement due to the narrow width of each of the individual units 20. As shown, a plurality of units 20 are placed directly next to each other with their translator arm ends 110A positioned in parallel relation for interacting with a conveyor belt or other work station (not shown). The input shafts 28 of each of these units 20 is equipped with a bevel gear 138 which engages a respective bevel gear 140 positioned next to each unit along a central drive shaft 142. Prefereably, a housing 144 is positioned to cover this bevel gears 138 and 140.

While in the foregoing, embodiments of the invention have been disclosed in considerable detail for purposes of illustration, it would be understood by those skilled in the art that many of these details may be varied without departing from the spirit and scope of this invention.

I claim:

1. A pick-and-place assembly for moving work pieces cyclically between adjacent work stations, said assembly comprising:

an input shaft rotably mounted in a housing and having a lift cam and a translator cam mounted thereon;

first and second output shafts rotably mounted in said housing generally transverse to said input shaft;

a first cam follower mounted on said first output shaft and engaging said translator cam, and a second cam follower mounted on said second output shaft and engaging said lift cam;

a carriage plate disposed in said housing and having a first set of V-rollers mounted thereon for slidably engaging respective V-tracks mounted on a carriage guide bar in said housing, said carriage plate having a second set of V-rollers mounted thereon and positioned to slidably receive respective V-tracks mounted on a translator bar;

a translator arm having a first end mounted on said first output shaft and a distal end positioned to engage said translator bar such that when said input shaft is rotated, said translator arm imparts horizontal movement to said translator bar; and a lift arm having a first end mounted on said second output shaft and a distal end connected to said carriage plate such that when said input shaft is rotated, said lift arm impacts vertical movement to said carriage plate and said translator bar.

2. The invention of claim 1 wherein said lift cam and said translator cam are roller gear cams.

3. The invention of claim 3 wherein said carriage guide bar is fixedly mounted to said housing.

4. The invention of claim 1 wherein said first set of V-rollers mounted on said carriage plate includes four V-rollers and said V-tracks comprise a first V-track mounted on one side of said carriage guide bar and a second V-track mounted on the other side of said carriage guide bar, whereby a first pair of said V-rollers engages said first V-track and a second pair of said V-rollers engages said second V-track.

5. The invention of claim 4 wherein one of said pair of said V-rollers is each mounted on an eccentric bushing which allows the V-roller to be pre-loaded against said V-tracks.

6. The invention of claim 1 wherein said second set of V-rollers mounted on said carriage plate includes four V-rollers and said V-tracks comprise a first V-track mounted along an upper edge of said translator bar and a second V-track mounted along a lower edge of said translator bar, whereby a first pair of said V-rollers engages said first V-track and a second pair of said V-rollers engages said second V-track. said V-rollers is each mounted on an eccentric bushing which allows said V-rollers to be pre-loaded against said V-tracks.

7. The invention of claim 6 wherein one of said pair of said V-rollers is each mounted on an eccentric bushing which allows said V-rollers to be pre-loaded against said V-tracks.

8. The invention of claim 1 wherein said input shaft and said translator bar are substantially mounted in the same plane.

9. The invention of claim 1 wherein said housing has a center line and said translator bar and said input shaft are positioned in parallel alignment along said center line.

10. The invention of claim 1 wherein a plurality of said linear pick-and-place assemblies are closely spaced in parallel alignment and said input shafts are driven by a common drive shaft.

11. The invention of claim 10 wherein said input shafts each have a beveled gear mounted thereon to engage one of a plurality of beveled gears mounted along said common drive shaft.

12. The invention of claim 1 wherein a plurality of said linear pick-and-place assemblies are radially positioned substantially equidistant about a central axis, said plurality of assemblies each having said input shafts connected to a common drive means.

13. The invention of claim 12 wherein each of said input shafts has a beveled gear disposed thereon and in engagement with a central bevel gear connected to a drive means.

* * * * *

UNITED STATES PATENT AND TRADEMARK OFFICE
CERTIFICATE OF CORRECTION

PATENT NO. : 5,345,831
DATED : September 13, 1994
INVENTOR(S) : Don G. Sandrock

It is certified that error appears in the above-indentified patent and that said Letters Patent is hereby corrected as shown below:

In claim 1, column 6, line 37, "impacts" should be —imparts—.

In claim 6, column 6, lines 62-64, delete "said V-rollers is each mounted on an eccentric bushing which allows said V-rollers to be pre-loaded against said V-tracks".

Signed and Sealed this

Twenty-ninth Day of November, 1994

Attest:

BRUCE LEHMAN

*Attesting Officer*  *Commissioner of Patents and Trademarks*